US011715870B2

(12) United States Patent
Tsai et al.

(10) Patent No.: US 11,715,870 B2
(45) Date of Patent: Aug. 1, 2023

(54) WAVEGUIDE STRUCTURE COMPRISING FIRST AND SECOND CARRIER AND CONDUCTIVE COMPONENTS FIXED BY CONVEX AND CONCAVE COMPONENTS AND METHOD OF MANUFACTURING

(71) Applicant: Taiwan Inpaq electronic Co., Ltd., Miaoli County (TW)

(72) Inventors: Kai-Hsiang Tsai, Taipei (TW); Wei-Lin Liu, Hsinchu County (TW); Ta-Fu Cheng, Miaoli County (TW)

(73) Assignee: Taiwan Inpaq electronic Co., Ltd., Miaoli County (TW)

( * ) Notice: Subject to any disclaimer, the term of this patent is extended or adjusted under 35 U.S.C. 154(b) by 177 days.

(21) Appl. No.: 17/203,761

(22) Filed: Mar. 17, 2021

(65) Prior Publication Data

US 2022/0057703 A1    Feb. 24, 2022

(30) Foreign Application Priority Data

Aug. 21, 2020    (TW) .................................. 109128553

(51) Int. Cl.
*H01P 3/12*    (2006.01)
*H01P 11/00*    (2006.01)
*G03B 21/20*    (2006.01)

(52) U.S. Cl.
CPC .............. *H01P 3/12* (2013.01); *H01P 11/002* (2013.01); *G03B 21/2033* (2013.01)

(58) Field of Classification Search
CPC ........... H01P 3/12; H01P 3/121; H01P 11/002

USPC .......................................................... 333/239
See application file for complete search history.

(56) References Cited

U.S. PATENT DOCUMENTS

| 6,185,354 | B1 * | 2/2001 | Kronz et al. | ............ | H01P 3/121 |
| | | | | | 385/129 |
| 8,614,610 | B2 * | 12/2013 | Hacker et al. | ............ | H01P 3/12 |
| | | | | | 333/248 |
| 2012/0152454 | A1 * | 6/2012 | Mass et al. | ............... | H01P 3/06 |
| | | | | | 174/547 |

* cited by examiner

*Primary Examiner* — Benny T Lee
(74) *Attorney, Agent, or Firm* — Li & Cai Intellectual Property Office

(57) ABSTRACT

A waveguide structure and a method of manufacturing the same, and an electronic device are provided. The electronic device includes a control module, an antenna module and a waveguide structure connected between the control module and the antenna module. The waveguide structure includes an insulating carrier component and a conductive metal component. The insulating carrier component includes a first insulating carrier and a second insulating carrier matching with the first insulating carrier. The first insulating carrier includes a first groove, and the second insulating carrier includes a second groove in communication with the first groove. The conductive metal component includes a first conductive body accommodated in the first groove of the first insulating carrier and a second conductive body accommodated in the second groove of the second insulating carrier, and the conductive metal component includes a penetrating channel passing therethrough.

9 Claims, 10 Drawing Sheets

WAVEGUIDE STRUCTURE COMPRISING FIRST AND SECOND CARRIER AND CONDUCTIVE COMPONENTS FIXED BY CONVEX AND CONCAVE COMPONENTS AND METHOD OF MANUFACTURING

CROSS-REFERENCE TO RELATED PATENT APPLICATION

This application claims the benefit of priority to Taiwan Patent Application No. 109128553, filed on Aug. 21, 2020. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a waveguide structure, and more particularly to an electronic device using the waveguide structure and a method of manufacturing the waveguide structure.

BACKGROUND OF THE DISCLOSURE

A waveguide can be used to transmit electromagnetic waves, but the conventional waveguide still has room for improvement.

SUMMARY OF THE DISCLOSURE

In response to the above-referenced technical inadequacies, the present disclosure provides a waveguide structure and a method of manufacturing the same, and an electronic device.

In one aspect, the present disclosure provides a waveguide structure, including an insulating carrier component and a conductive metal component. The insulating carrier component includes a first insulating carrier and a second insulating carrier matching with the first insulating carrier. The first insulating carrier includes a first groove, and the second insulating carrier includes a second groove in communication with the first groove. The conductive metal component includes a first conductive body accommodated in the first groove of the first insulating carrier and a second conductive body accommodated in the second groove of the second insulating carrier, and the conductive metal component includes a penetrating channel passing therethrough.

In another aspect, the present disclosure provides an electronic device, including a control module, an antenna module and a waveguide structure connected between the control module and the antenna module. The waveguide structure includes an insulating carrier component and a conductive metal component. The insulating carrier component includes a first insulating carrier and a second insulating carrier matching with the first insulating carrier. The first insulating carrier includes a first groove, and the second insulating carrier includes a second groove in communication with the first groove. The conductive metal component includes a first conductive body accommodated in the first groove of the first insulating carrier and a second conductive body accommodated in the second groove of the second insulating carrier, and the conductive metal component includes a penetrating channel passing therethrough.

In yet another aspect, the present disclosure provides a method of manufacturing a waveguide structure, including: providing an insulating carrier component, the insulating carrier component including a first insulating carrier and a second insulating carrier corresponding to the first insulating carrier, the first insulating carrier includes a first groove, and the second insulating carrier includes a second groove corresponding to the first groove; forming a conductive metal component on the insulating carrier component, wherein the conductive metal component includes a first conductive body accommodated in the first groove of the first insulating carrier and a second conductive body accommodated in the second groove of the second insulating carrier; and then connecting the first insulating carrier with the second insulating carrier so as to connect the first conductive body with the second conductive body and to form a penetrating channel that passes through the conductive metal component.

Therefore, by virtue of "the insulating carrier component including a first insulating carrier and a second insulating carrier matching with the first insulating carrier, the first insulating carrier including a first groove, and the second insulating carrier including a second groove in communication with the first groove" and "the conductive metal component including a first conductive body accommodated in the first groove of the first insulating carrier and a second conductive body accommodated in the second groove of the second insulating carrier, and the conductive metal component including a penetrating channel passing therethrough", an electromagnetic wave can be transmitted inside the penetrating channel provided by the conductive metal component of the waveguide structure, and the weight and the cost of the waveguide structure can be reduced.

Moreover, by virtue of "providing an insulating carrier component, wherein the insulating carrier component includes a first insulating carrier and a second insulating carrier corresponding to the first insulating carrier, the first insulating carrier includes a first groove, and the second insulating carrier includes a second groove corresponding to the first groove", "forming a conductive metal component on the insulating carrier component, wherein the conductive metal component includes a first conductive body accommodated in the first groove of the first insulating carrier and a second conductive body accommodated in the second groove of the second insulating carrier" and "connecting the first insulating carrier with the second insulating carrier so as to connect the first conductive body with the second conductive body and to form a penetrating channel that passes through the conductive metal component", an electromagnetic wave can be transmitted inside the penetrating channel provided by the conductive metal component of the waveguide structure, and the weight and the cost of the waveguide structure can be reduced.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
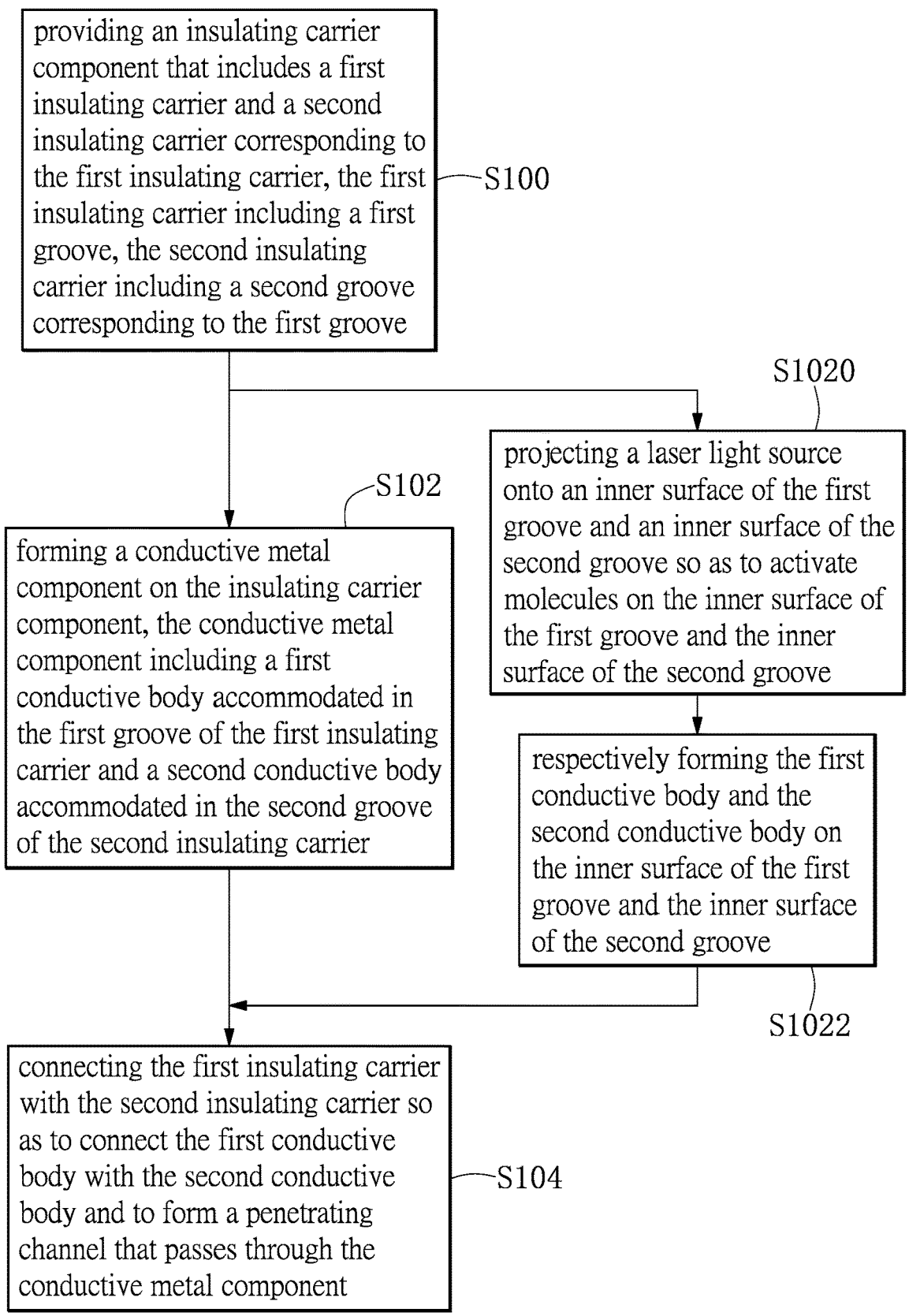
FIG. 1 is a flowchart of a method of manufacturing a waveguide structure according to a first embodiment of the present disclosure.

The present disclosure is more particularly described in the following examples that are intended as illustrative only since numerous modifications and variations therein will be apparent to those skilled in the art. Like numbers in the drawings indicate like components throughout the detailed description of the various views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

First Embodiment

Figure 2:
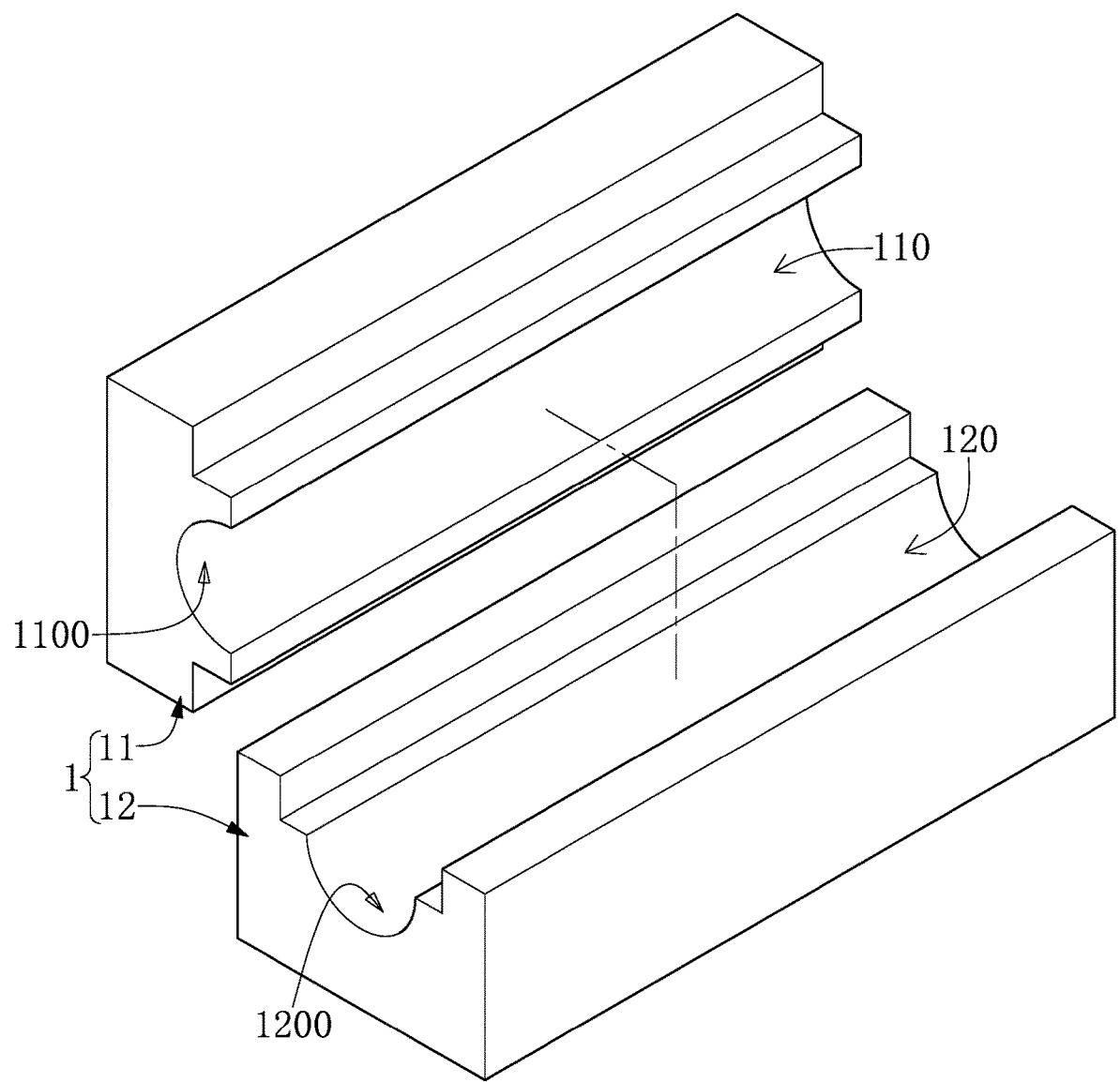
FIG. 2 is a schematic view of step S100 of the method of manufacturing the waveguide structure according to the first embodiment of the present disclosure.
Figure 3:
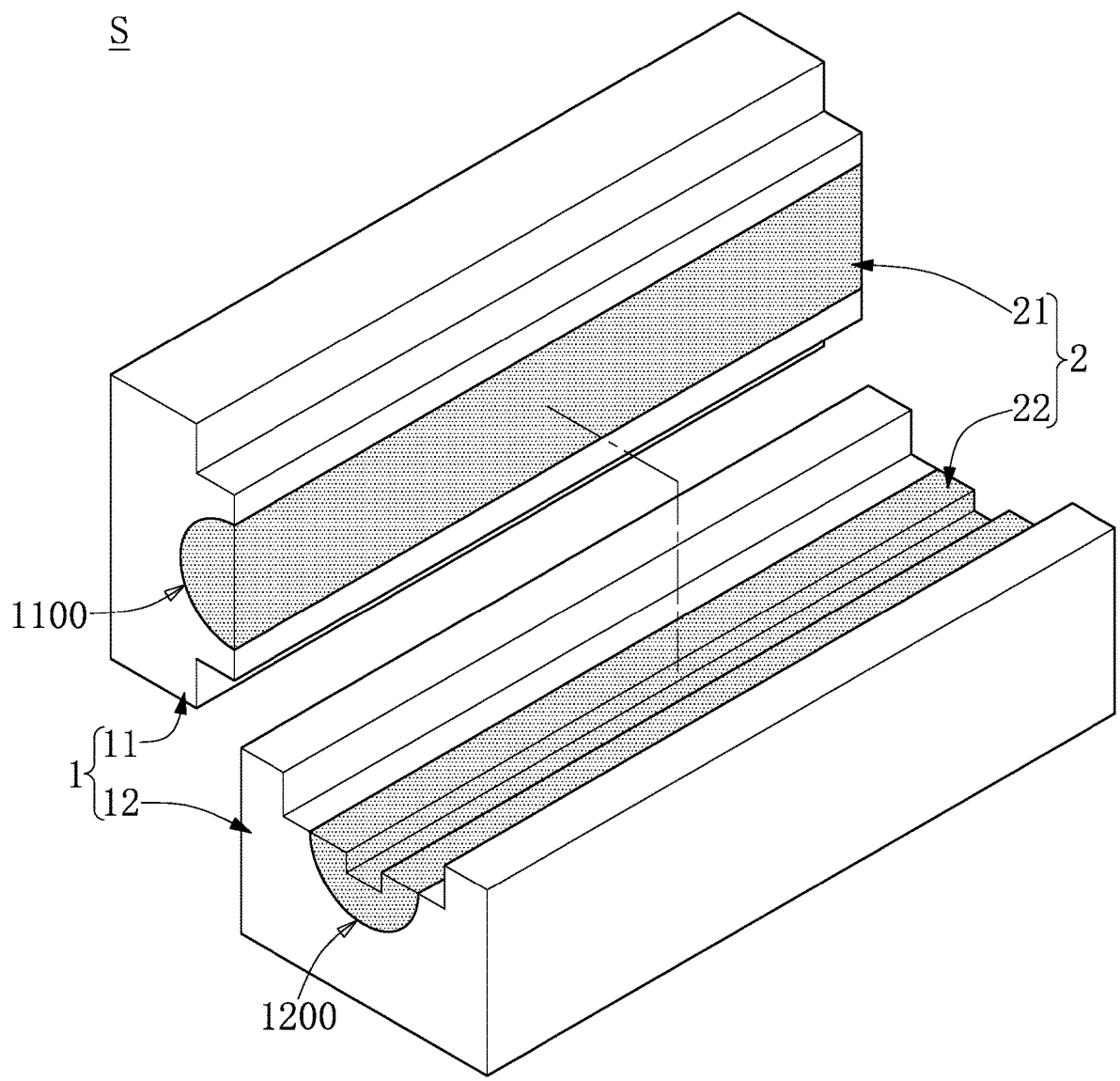
FIG. 3 is a schematic view of step S102 of the method of manufacturing the waveguide structure according to the first embodiment of the present disclosure.
Figure 4:
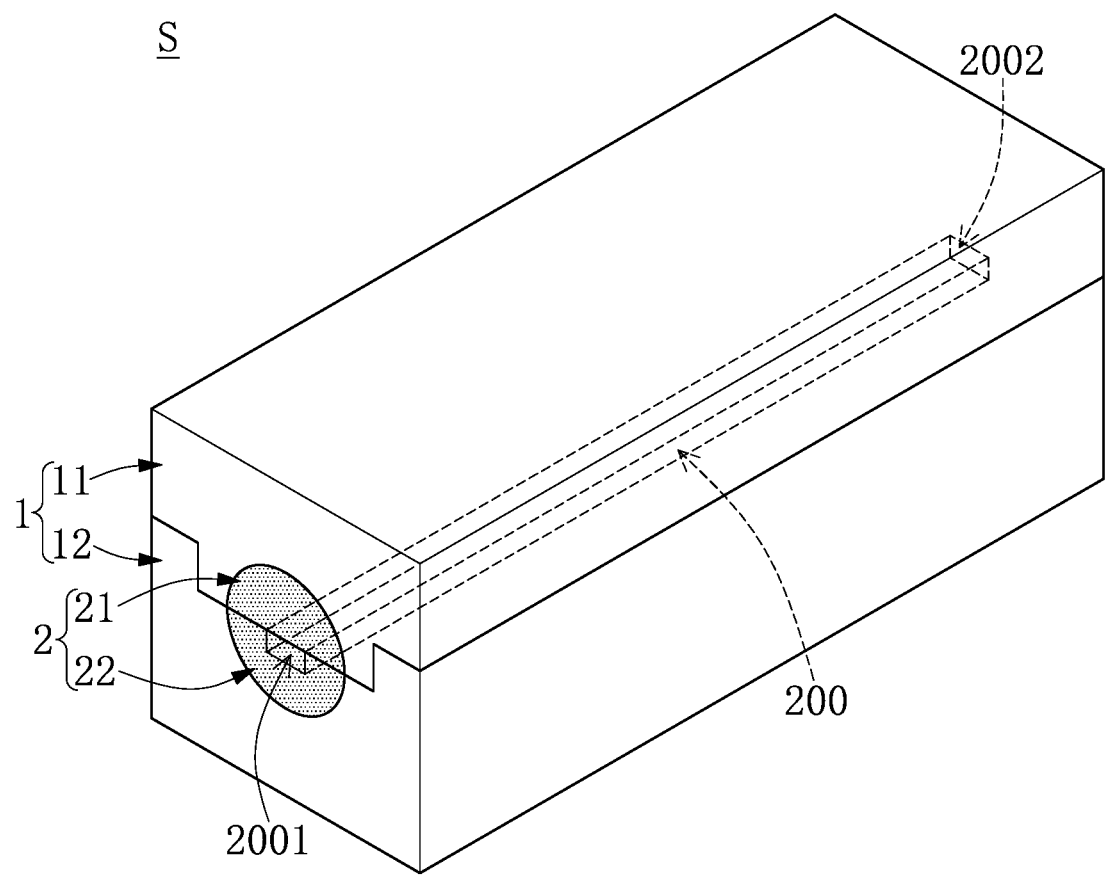
FIG. 4 is a schematic view of a step S104 of the method of manufacturing the waveguide structure according to the first embodiment of the present disclosure, and is also a perspective assembled schematic view of the waveguide structure according to the first embodiment of the present disclosure.

Referring to FIG. 1 to FIG. 5, a first embodiment of the present disclosure provides a method of manufacturing a waveguide structure S (FIGS. 3, 4 and 5), including: firstly, referring to FIG. 1 and FIG. 2, providing as shown in FIG. 2 an insulating carrier component 1, wherein the insulating carrier component 1 includes a first insulating carrier 11 and a second insulating carrier 12 corresponding to the first insulating carrier 11, the first insulating carrier 11 includes a first groove 110, and the second insulating carrier 12 includes a second groove 120 corresponding to the first groove 110 (step S100 in FIG. 1); next, referring to FIG. 1 and FIG. 3, forming as shown in FIG. 3 a conductive metal component 2 on the insulating carrier component 1, wherein the conductive metal component 2 includes a first conductive body 21 accommodated in the first groove 110 (FIG. 2) of the first insulating carrier 11 and a second conductive body 22 accommodated in the second groove 120 (FIG. 2) of the second insulating carrier 12 (step S102 in FIG. 1); and then referring to FIG. 1 and FIG. 4, connecting as shown in FIG. 4 the first insulating carrier 11 with the second insulating carrier 12 so as to connect the first conductive body 21 with the second conductive body 22 and to form a penetrating channel 200 that passes through the conductive metal component 2 (step S104 in FIG. 1). That is to say, as shown in FIG. 4, the first conductive body 21 and the second conductive body 22 can be matched with each other to form an inner metal wall of the waveguide structure S, and the penetrating channel 200 has a first opening 2001 and a second opening 2002 opposite to each other, and can be formed and surrounded by the inner metal wall.

For example, referring to FIG. 1 to FIG. 3, the step of forming the conductive metal component 2 on the insulating carrier component 1 further includes: firstly, referring to FIG. 1 and FIG. 2, projecting a laser light source (not shown) onto an inner surface 1100 (FIG. 2) of the first groove 110 and an inner surface 1200 (FIG. 2) of the second groove 120 so as to activate molecules (or surface molecules) on the inner surface 1100 of the first groove 110 and the inner surface 1200 of the second groove 120 (step S1020 in FIG. 1); and then referring to FIG. 1 and FIG. 3, respectively forming as shown in FIG. 3 the first conductive body 21 and the second conductive body 22 on the inner surface 1100 (or the activated inner surface) of the first groove 110 and the inner surface 1200 (or the activated inner surface) of the second groove 120 (step S1022 in FIG. 1). It should be noted that when the laser light source is projected onto the inner surface 1100 of the first groove 110 and the inner surface 1200 of the second groove 120, metal molecules on the inner surface 1100 of the first groove 110 and metal molecules on the inner surface 1200 of the second groove 120 can be activated by irradiation of the laser light source. In addition, the first conductive body 21 and the second conductive body 22 can be respectively formed on the inner surface 1100 of the first groove 110 and the inner surface 1200 of the second groove 120 by electroplating, sputtering, coating or any process method, and a thickness of the first conductive body 21 or the second conductive body 22 of the conductive metal component 2 is substantially between 10 nm and 50 nm. However, the aforementioned description is merely an example and is not meant to limit the scope of the present disclosure.

Figure 5:
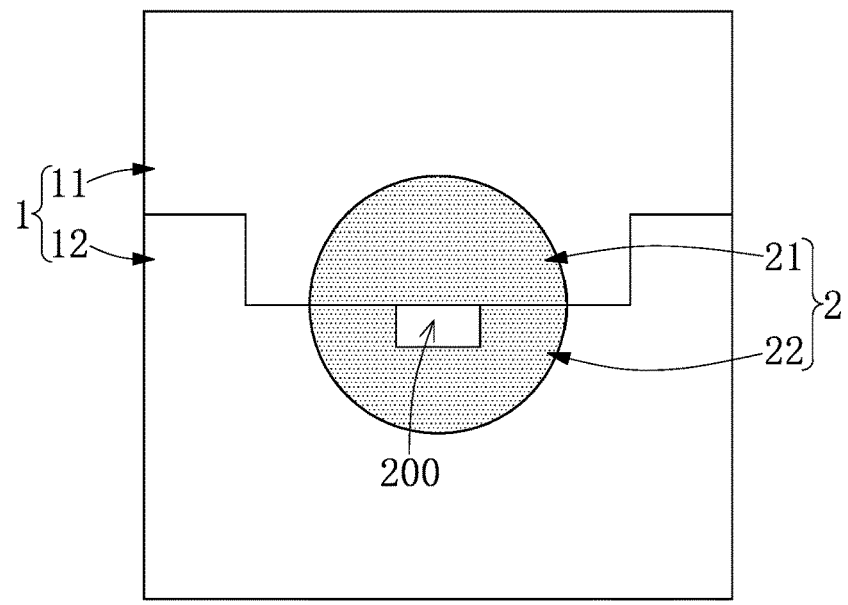
FIG. 5 is a side assembled schematic view of the waveguide structure according to the first embodiment of the present disclosure.
Figure 6:
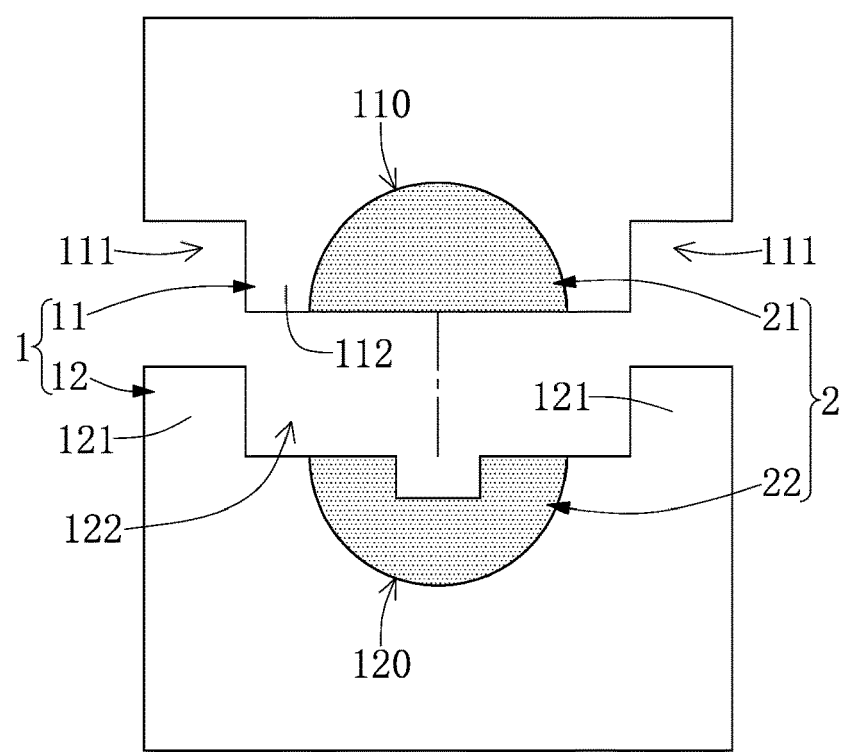
FIG. 6 is a side exploded schematic view of the waveguide structure according to the first embodiment of the present disclosure.

Moreover, referring to FIG. 4 to FIG. 6, the first embodiment of the present disclosure further provides a waveguide structure S, including an insulating carrier component 1 and a conductive metal component 2. The insulating carrier component 1 includes a first insulating carrier 11 and a second insulating carrier 12 matching with the first insulating carrier 11. The first insulating carrier 11 includes a first groove 110 (FIG. 6), and the second insulating carrier 12 includes a second groove 120 (FIG. 6) in communication with the first groove 110. In addition, the conductive metal component 2 includes a first conductive body 21 accommodated in the first groove 110 of the first insulating carrier 11 and a second conductive body 22 accommodated in the second groove 120 of the second insulating carrier 12, and the conductive metal component 2 includes a penetrating channel 200 (FIGS. 4 and 5) passing therethrough.

For example, the first insulating carrier 11 and the second insulating carrier 12 may be made of plastic material or any insulative material, so that the manufacturing cost and the total weight of the waveguide structure S can be reduced. In addition, according to different requirements, the first insulating carrier 11 and the second insulating carrier 12 can be integrally combined (or connected) to form a single insulating component, and the first conductive body 21 and the second conductive body 22 can be integrally combined (or connected) to form a single conductive component. That is to say, the insulating carrier component 1 may be a single component or can be formed by more than two elements, and the conductive metal component 2 may be a single component or can be formed by more than two elements. Moreover, according to different requirements, the penetrating channel 200 can pass through one of the first conductive body 21 and the second conductive body 22 (as shown in FIG. 5), and the penetrating channel 200 may be a single through hole that passes through the first conductive body 21 or the second conductive body 22. Furthermore, according to different requirements, the first conductive body 21 may be a first single conductive material layer or a first conductive composite material layer, and the first conductive composite material layer includes a first conductive base layer (such as Cu layer) received inside the first groove 110 of the first insulating carrier 11 and a first conductive covering layer (such as Ag, Au, Ni or Cr layer) formed on the first conductive base layer. In addition, according to different requirements, the second conductive body 22 may be a second single conductive material layer or a second conductive composite material layer, and the second conductive composite material layer includes a second conductive base layer (such as Cu layer) received inside the second groove 120 of the second insulating carrier 12 and a second conductive covering layer (such as Ag, Au, Ni or Cr layer) formed on the second conductive base layer. However, the aforementioned description is merely an example and is not meant to limit the scope of the present disclosure.

For example, referring to FIG. 5 and FIG. 6, the first insulating carrier 11 has two first concave portions 111 as shown in FIG. 6 (such as two first concave spaces) and a first convex portion 112 (FIG. 6) disposed between the two first concave portions 111. The second insulating carrier 12 has two second convex portions 121 (FIG. 6) and a second concave portion 122 (FIG. 6) (such as a second concave space) disposed between the two second convex portions 121. The two second convex portions 121 can be respectively received inside the two first concave portions 111, and the first convex portion 112 can be received inside the second concave portion 122, so that the first insulating carrier 11 and the second insulating carrier 12 can match and be connected with each other. Moreover, the first groove 110 of the first insulating carrier 11 and the first conductive body 21 of the conductive metal component 2 are disposed inside the first convex portion 112 of the first insulating carrier 11, and the second groove 120 of the second insulating carrier 12 and the second conductive body 22 of the conductive metal component 2 are disposed under the second concave portion 122 of the second insulating carrier 12. However, the aforementioned description is merely an example and is not meant to limit the scope of the present disclosure.

Figure 7:
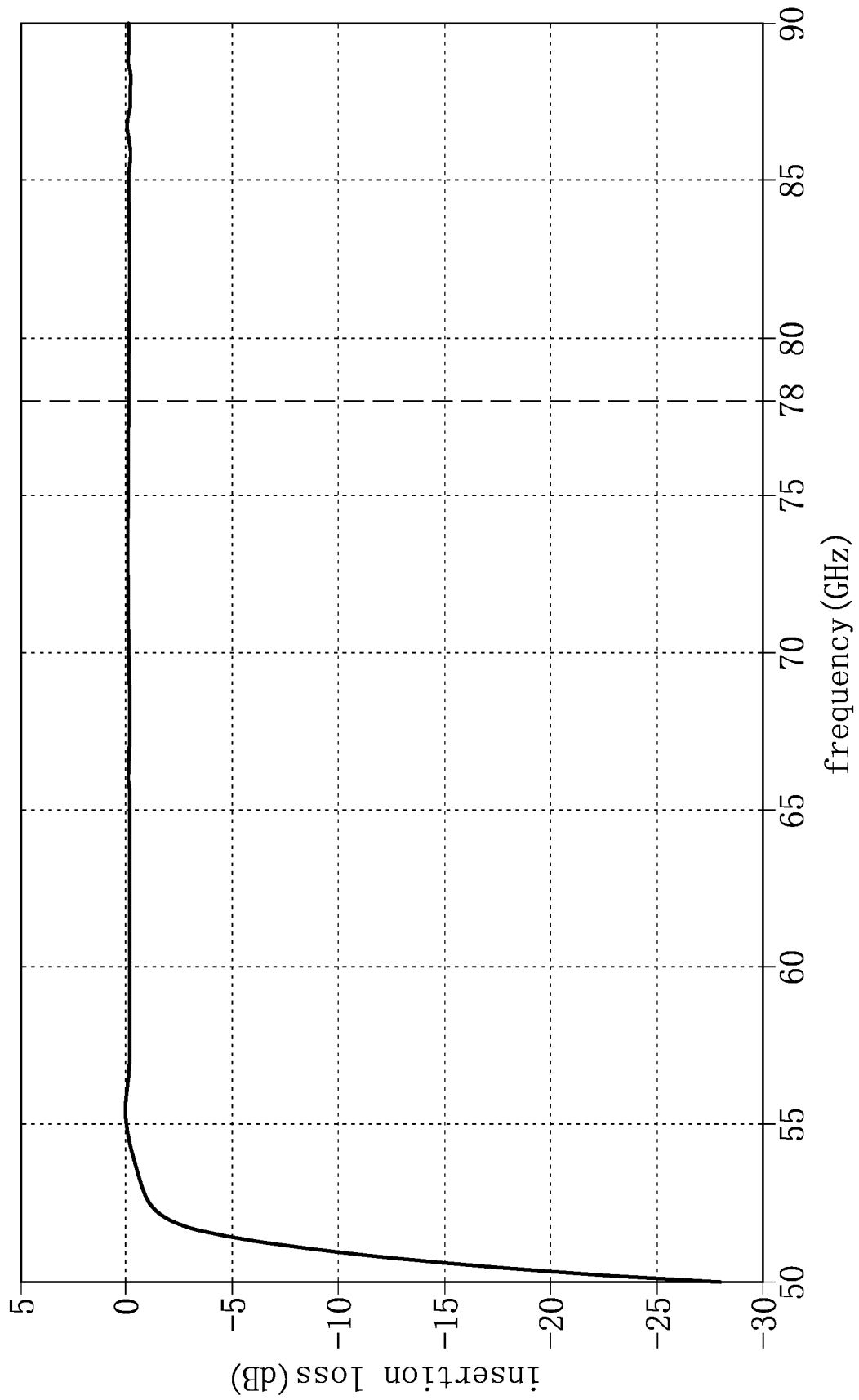
FIG. 7 is a curve diagram of the insertion loss (dB) of the waveguide structure against different frequencies (GHz) according to the first embodiment of the present disclosure.

For example, as shown in FIG. 7, the waveguide structure S (FIGS. 3, 4 and 5) of the present disclosure can be applied as a millimeter-wave waveguide. When the penetrating channel 200 (FIGS. 4 and 5) of the waveguide structure S has a length of about 50 mm and a cross-sectional size of about $3.01 \times 1.55$ mm$^2$, the insertion loss (S21) of the waveguide structure S in a millimeter wave band is less than 1 dB, and the insertion loss of the waveguide structure S in a center frequency (about 78 GHz) of an automotive radar band (about 76~81 GHz) is about 0.13 dB, so that a transmission loss of the waveguide structure S can be reduced.

Second Embodiment

Figure 8:
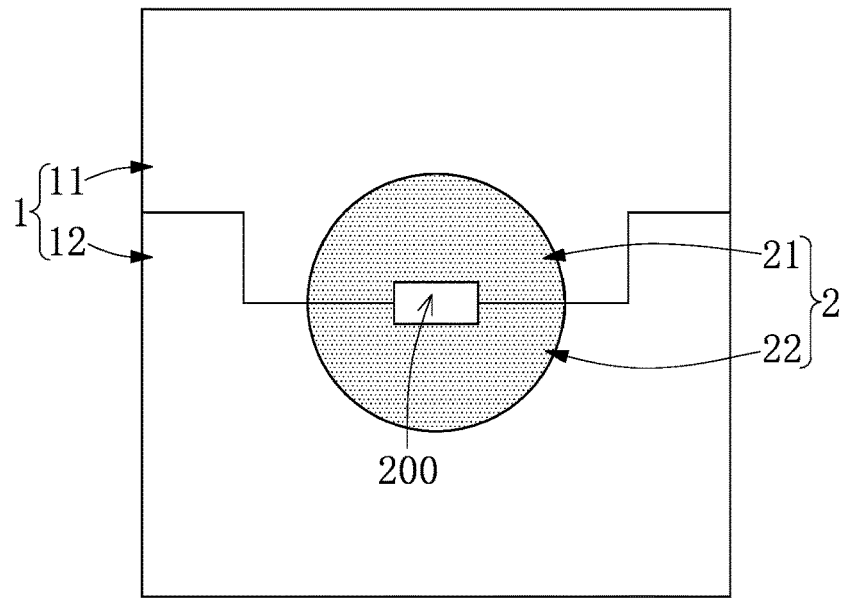
FIG. 8 is a side assembled schematic view of the waveguide structure according to a second embodiment of the present disclosure.
Figure 9:
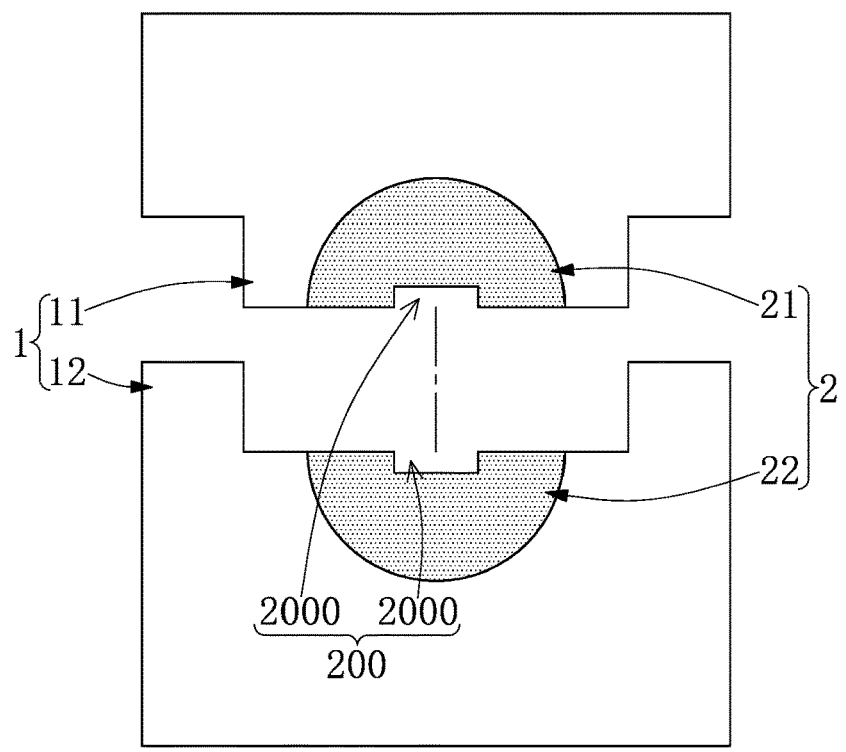
FIG. 9 is a side exploded schematic view of the waveguide structure according to the second embodiment of the present disclosure.

Referring to FIG. 8 and FIG. 9, a second embodiment of the present disclosure provides a waveguide structure S, including an insulating carrier component 1 and a conductive metal component 2. Comparing FIG. 8 with FIG. 5, and comparing FIG. 9 with FIG. 6, the difference between the second embodiment and the first embodiment is as follows: in the second embodiment, the penetrating channel 200 can concurrently pass through all of the first conductive body 21 and the second conductive body 22, and the penetrating channel 200 has two through grooves 2000 (FIG. 9) communicated with each other and respectively passing through the first conductive body 21 and the second conductive body 22. That is to say, according to different requirements, the penetrating channel 200 can pass through one of the first conductive body 21 and the second conductive body 22 (as shown in the first embodiment of FIG. 5 or FIG. 6), or the penetrating channel 200 can concurrently pass through all of the first conductive body 21 and the second conductive body 22 (as shown in the second embodiment of FIG. 8 or FIG. 9).

Third Embodiment

Figure 10:
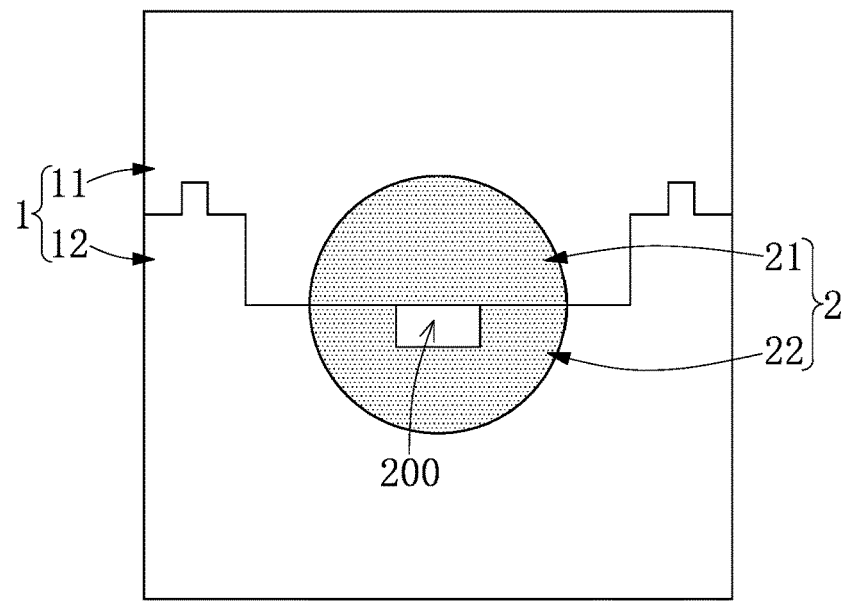
FIG. 10 is a side assembled schematic view of the waveguide structure according to a third embodiment of the present disclosure.
Figure 11:
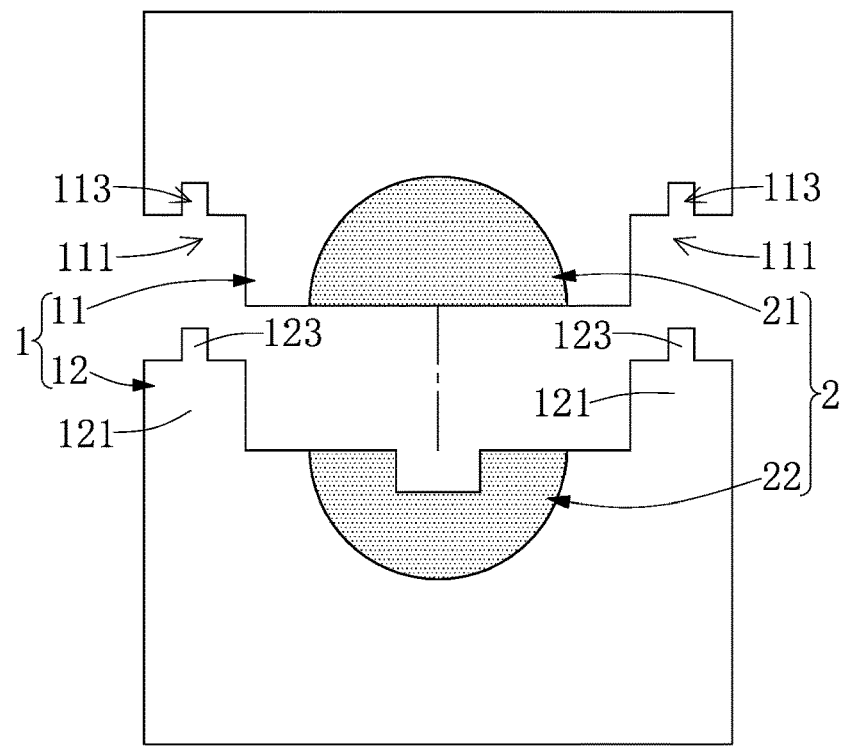
FIG. 11 is a side exploded schematic view of the waveguide structure according to the third embodiment of the present disclosure.

Referring to FIG. 10 and FIG. 11, a third embodiment of the present disclosure provides a waveguide structure S, including an insulating carrier component 1 and a conductive metal component 2. Comparing FIG. 10 with FIG. 5, and comparing FIG. 11 with FIG. 6, the difference between the third embodiment and the first embodiment is as follows: in the third embodiment, the first insulating carrier 11 includes at least one first positioning portion 113 (FIG. 11), the second insulating carrier 12 includes at least one second positioning portion 123 (FIG. 11), and the at least one first positioning portion 113 and the at least one second positioning portion 123 can be matched with each other so as to fix or restrict a relative positioning between the first insulating carrier 11 and the second insulating carrier 12. For example, as shown in FIG. 11, the first insulating carrier 11 includes two first positioning portions 113 (such as two concave portions) respectively disposed under the two first concave portions 111, and the second insulating carrier 12 includes two second positioning portions 123 (such as two convex portions) respectively disposed on the two second convex portions 121. However, the aforementioned description is merely an example and is not meant to limit the scope of the present disclosure.

Fourth Embodiment

Figure 12:
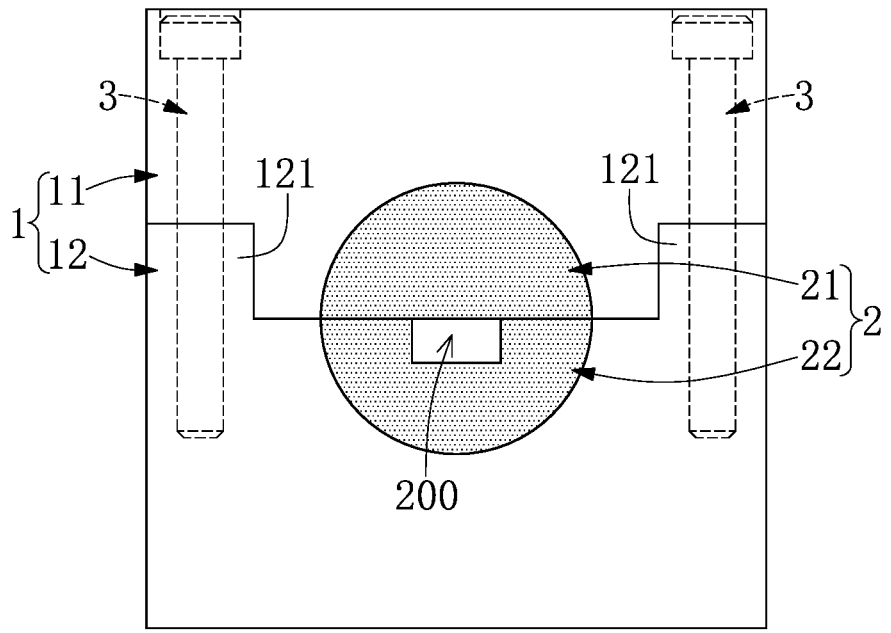
FIG. 12 is a side assembled schematic view of the waveguide structure according to a fourth embodiment of the present disclosure.

Referring to FIG. 12, a fourth embodiment of the present disclosure provides a waveguide structure S, including an insulating carrier component 1 and a conductive metal component 2. Comparing FIG. 12 with FIG. 5, the difference between the fourth embodiment and the first embodiment is as follows: the waveguide structure S of the fourth embodiment further includes a plurality of fixing components 3 for connecting the first insulating carrier 11 with the second insulating carrier 12. That is to say, the first insulating carrier 11 and the second insulating carrier 12 can be connected with each other by the plurality of fixing components 3. For example, the fixing component 3 may be a screw, a bolt or any fixing structure for fixing the first insulating carrier 11 and the second insulating carrier 12. In addition, each of the fixing components 3 can pass through the first insulating carrier 11 (as shown in FIG. 12) or the second insulating carrier 12, and the fixing component 3 can pass through the second convex portion 121 of the second insulating carrier 12 (as shown in FIG. 12). It should be noted that when the fixing component 3 is connected between the first insulating carrier 11 and the second insulating carrier 12, the fixing component 3 is distant to the first conductive body 21, the second conductive body 22 and the penetrating channel 200. However, the aforementioned description is merely an example and is not meant to limit the scope of the present disclosure.

Fifth Embodiment

Figure 13:
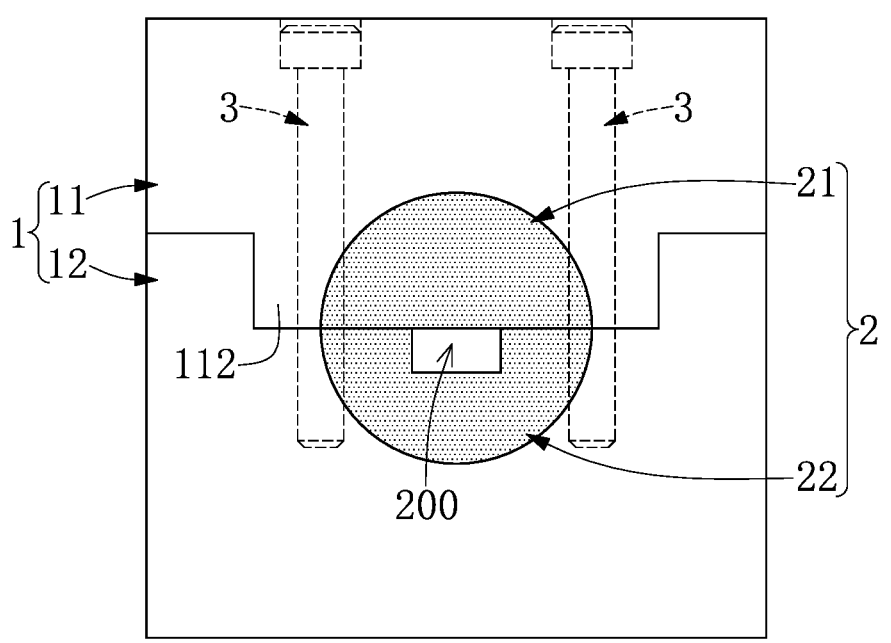
FIG. 13 is a side assembled schematic view of the waveguide structure according to a fifth embodiment of the present disclosure.

Referring to FIG. 13, a fifth embodiment of the present disclosure provides a waveguide structure S, including an insulating carrier component 1 and a conductive metal component 2. Comparing FIG. 13 with FIG. 5, the difference between the fifth embodiment and the first embodiment is as follows: the waveguide structure S of the fifth embodiment further includes a plurality of fixing components 3 for connecting the first insulating carrier 11 with the second insulating carrier 12 (that is to say, the first insulating carrier 11 and the second insulating carrier 12 can be connected with each other by the plurality of fixing components 3), or connecting the first conductive body 21 with the second conductive body 22 (that is to say, the first conductive body 21 and the second conductive body 22 can be connected with each other by the plurality of fixing components 3). For example, the fixing component 3 may be a screw, a bolt or any fixing structure or adhesive material for fixing the first insulating carrier 11 and the second insulating carrier 12 (or fixing the first conductive body 21 and the second conductive body 22). In addition, each of the fixing components 3 can pass through the first insulating carrier 11 (as shown in FIG. 12) or the second insulating carrier 12, and the fixing component 3 can pass through the first convex portion 112 of the first insulating carrier 11 (as shown in FIG. 13). It should be noted that when the fixing component 3 is connected between the first insulating carrier 11 and the second insulating carrier 12, the fixing component 3 is adjacent to the penetrating channel 200 so as to contact the first conductive body 21 and the second conductive body 22. However, the aforementioned description is merely an example and is not meant to limit the scope of the present disclosure.

Sixth Embodiment

Figure 14:
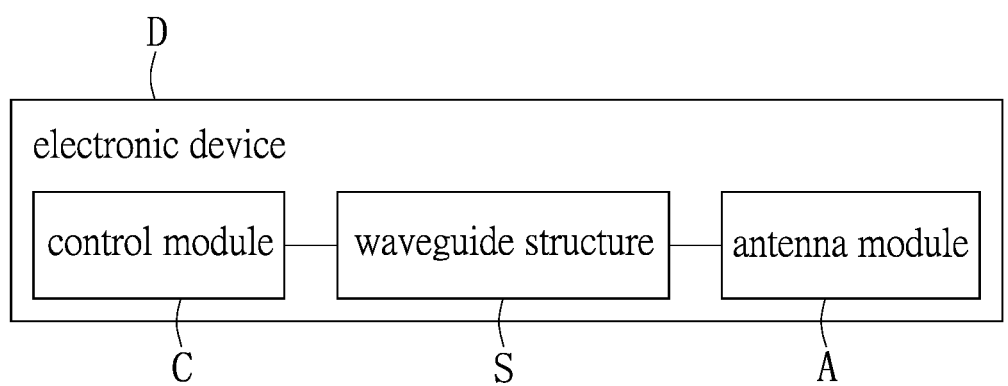
FIG. 14 is a functional block diagram of an electronic device according to a sixth embodiment of the present disclosure.

Referring to FIG. 14, a sixth embodiment of the present disclosure provides an electronic device D, including a control module C, an antenna module A and a waveguide structure S connected between the control module C and the antenna module A, and the electronic device D can use any one of the waveguide structures S disclosed in the first to the fifth embodiments. It should be noted that as shown in FIG. 4 the penetrating channel 200 has a first opening 2001 connected to the control module C and a second opening 2002 connected to the antenna module A. Hence, signals (such as electromagnetic waves) generated by the control module C can be transmitted to the antenna module A through the waveguide structure S, and signals (such as electromagnetic waves) received by the antenna module A can be transmitted to the control module C through the waveguide structure S.

In conclusion, by virtue of "the insulating carrier component 1 including a first insulating carrier 11 and a second insulating carrier 12 matching with the first insulating carrier 11, the first insulating carrier 11 including a first groove 110, and the second insulating carrier 12 including a second groove 120 in communication with the first groove 110" and "the conductive metal component 2 including a first conductive body 21 accommodated in the first groove 110 of the first insulating carrier 11 and a second conductive body 22 accommodated in the second groove 120 of the second insulating carrier 12, and the conductive metal component 2 including a penetrating channel 200 passing therethrough", an electromagnetic wave can be transmitted inside the penetrating channel 200 provided by the conductive metal component 2 of the waveguide structure S, and the weight and the cost of the waveguide structure S can be reduced.

Moreover, by virtue of "providing an insulating carrier component 1, wherein the insulating carrier component 1 includes a first insulating carrier 11 and a second insulating carrier 12 corresponding to the first insulating carrier 11, the first insulating carrier 11 includes a first groove 110, and the second insulating carrier 12 includes a second groove 120 corresponding to the first groove 110", "forming a conductive metal component 2 on the insulating carrier component 1, wherein the conductive metal component 2 includes a first conductive body 21 accommodated in the first groove 110 of the first insulating carrier 11 and a second conductive body 22 accommodated in the second groove 120 of the second insulating carrier 12" and "connecting the first insulating carrier 11 with the second insulating carrier 12 so as to connect the first conductive body 21 with the second conductive body 22 and to form a penetrating channel 200 that passes through the conductive metal component 2", an electromagnetic wave can be transmitted inside the penetrating channel 200 provided by the conductive metal component 2 of the waveguide structure S, and the weight and the cost of the waveguide structure S can be reduced.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A waveguide structure, comprising:
   an insulating carrier component including a first insulating carrier and a second insulating carrier matching with the first insulating carrier, wherein the first insulating carrier includes a first groove, and the second insulating carrier includes a second groove in communication with the first groove;
   a conductive metal component including a first conductive body accommodated in the first groove of the first insulating carrier and a second conductive body accommodated in the second groove of the second insulating carrier, wherein the conductive metal component includes a penetrating channel passing therethrough; and
   a plurality of fixing components for connecting the first insulating carrier with the second insulating carrier and connecting the first conductive body with the second conductive body, wherein each of the fixing components passes through one of the first insulating carrier and the second insulating carrier;
   wherein the first insulating carrier has two first concave portions and a first convex portion disposed between the two first concave portions, the second insulating carrier has two second convex portions and a second concave portion disposed between the two second convex portions, the two second convex portions are respectively received inside the two first concave portions, and the first convex portion is received inside the second concave portion;
   wherein the first groove of the first insulating carrier and the first conductive body of the conductive metal component are disposed inside the first convex portion of the first insulating carrier, and the second groove of the second insulating carrier and the second conductive body of the conductive metal component are disposed under the second concave portion of the second insulating carrier.

2. The waveguide structure according to claim 1, wherein the penetrating channel passes through one of the first conductive body and the second conductive body, and the penetrating channel has a single through hole passing through one of the first conductive body and the second conductive body; wherein the first conductive body is a first single conductive material layer, and the second conductive body is a second single conductive material layer.

3. The waveguide structure according to claim 1, wherein the first insulating carrier includes at least one first positioning portion, the second insulating carrier includes at least one second positioning portion, and the at least one first positioning portion and the at least one second positioning portion match with each other so as to fix a relative positioning between the first insulating carrier and the second insulating carrier.

4. The waveguide structure according to claim 3, wherein each of the fixing components passes through one of the first convex portion of the first insulating carrier and the second convex portion of the second insulating carrier, and each of the fixing components is adjacent to the penetrating channel so as to contact the first conductive body and the second conductive body, or is distant to the first conductive body, the second conductive body and the penetrating channel; wherein the penetrating channel has a first opening connected to a control module and a second opening connected to an antenna module.

5. An electronic device, comprising a control module, an antenna module and a waveguide structure connected between the control module and the antenna module, wherein the waveguide structure includes an insulating carrier component and a conductive metal component;
   wherein the insulating carrier component includes a first insulating carrier and a second insulating carrier matching with the first insulating carrier, and the first insulating carrier includes a first groove, and the second insulating carrier includes a second groove in communication with the first groove;
   wherein the conductive metal component includes a first conductive body accommodated in the first groove of the first insulating carrier and a second conductive body accommodated in the second groove of the second insulating carrier, and the conductive metal component includes a penetrating channel passing therethrough;
   wherein the waveguide structure includes a plurality of fixing components for connecting the first insulating carrier with the second insulating carrier and connecting the first conductive body with the second conductive body, and each of the fixing components passes through one of the first insulating carrier and the second insulating carrier;
   wherein the first insulating carrier has two first concave portions and a first convex portion disposed between the two first concave portions, the second insulating carrier has two second convex portions and a second concave portion disposed between the two second convex portions, the two second convex portions are respectively received inside the two first concave portions, and the first convex portion is received inside the second concave portion;
   wherein the first groove of the first insulating carrier and the first conductive body of the conductive metal component are disposed inside the first convex portion of the first insulating carrier, and the second groove of the second insulating carrier and the second conductive body of the conductive metal component are disposed under the second concave portion of the second insulating carrier.

6. The electronic device according to claim 5, wherein the penetrating channel passes through one of the first conductive body and the second conductive body, and the penetrating channel has a single through hole passing through one of the first conductive body and the second conductive body; wherein the first conductive body is a first single conductive material layer, and the second conductive body is a second single conductive material layer.

7. The electronic device according to claim 5, wherein the first insulating carrier includes at least one first positioning portion, the second insulating carrier includes at least one second positioning portion, and the at least one first positioning portion and the at least one second positioning portion match with each other so as to fix a relative positioning between the first insulating carrier and the second insulating carrier.

8. The electronic device according to claim 7, wherein each of the fixing components passes through one of the first convex portion of the first insulating carrier and the second convex portion of the second insulating carrier, and each of the fixing components is adjacent to the penetrating channel so as to contact the first conductive body and the second conductive body, or is distant to the first conductive body, the second conductive body and the penetrating channel; wherein the penetrating channel has a first opening connected to the control module and a second opening connected to the antenna module.

9. A method of manufacturing a waveguide structure, comprising:

providing an insulating carrier component, wherein the insulating carrier component includes a first insulating carrier and a second insulating carrier corresponding to the first insulating carrier, the first insulating carrier includes a first groove, and the second insulating carrier includes a second groove corresponding to the first groove;

forming a conductive metal component on the insulating carrier component, wherein the conductive metal component includes a first conductive body accommodated in the first groove of the first insulating carrier and a second conductive body accommodated in the second groove of the second insulating carrier; and connecting the first insulating carrier with the second insulating carrier and connecting the first conductive body with the second conductive body by a plurality of fixing components so as to connect the first conductive body with the second conductive body and to form a penetrating channel that passes through the conductive metal component;

wherein each of the fixing components passes through one of the first insulating carrier and the second insulating carrier;

wherein the step of forming the conductive metal component on the insulating carrier component includes:

projecting a laser light source onto an inner surface of the first groove and an inner surface of the second groove so as to activate molecules on the inner surface of the first groove and the inner surface of the second groove; and respectively forming the first conductive body and the second conductive body on the inner surface of the first groove and the inner surface of the second groove.

* * * * *